US008000989B1

(12) United States Patent
Kiefhaber et al.

(10) Patent No.: US 8,000,989 B1
(45) Date of Patent: Aug. 16, 2011

(54) USING TRUE VALUE IN ROUTING WORK ITEMS TO RESOURCES

(75) Inventors: Sarah H. Kiefhaber, Boulder, CO (US);
Joylee E. Kohler, Northglenn, CO (US);
Henry R. Paddock, Boulder, CO (US);
Katherine A. Sobus, Wilmington, DE (US); Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1863 days.

(21) Appl. No.: 10/815,584

(22) Filed: Mar. 31, 2004

(51) Int. Cl.
*G06Q 40/00* (2006.01)

(52) U.S. Cl. .................. 705/7.12; 705/7.29; 705/35

(58) Field of Classification Search .............. 705/7.11, 705/7.13, 7.22, 7.26, 7.29, 35, 38
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. ............... 179/18 B |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond .................. 379/67 |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. ............... 379/309 |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A * | 3/1994 | Levy et al. .................. 379/242 |
| 5,299,260 A | 3/1994 | Shaio .......................... 379/265 |
| 5,309,513 A | 5/1994 | Rose .......................... 379/265 |
| 5,311,422 A | 5/1994 | Loftin et al. |

(Continued)

FOREIGN PATENT DOCUMENTS

CA 2143198 1/1995

(Continued)

OTHER PUBLICATIONS

Thayer Watkins, "Cost Benefit Analysis", 1999, San Jose State University Economics Department, Web Archive http://web.archive.org/web/19990225143131/http://www.sjsu.edu/faculty/watkins/cba.htm.*

(Continued)

*Primary Examiner* — Beth V Boswell
*Assistant Examiner* — Stephanie Zagarella
(74) *Attorney, Agent, or Firm* — Sheridan Ross P.C.

(57) ABSTRACT

The present invention is directed to a contact center 100 comprising (a) an input operable to receive a contact from a customer, the customer having an associated value to the contact center 100 and (b) a contact selector 216 operable to select a resource of the contact center 100 to service the contact based, at least in part, on the associated value. The associated value reflects one or more of a historic, predicted, and current monetary expense of the contact center to service the customer.

16 Claims, 4 Drawing Sheets

U.S. PATENT DOCUMENTS

| | | | |
|---|---|---|---|
| 5,325,292 A | 6/1994 | Crockett | |
| 5,335,268 A | 8/1994 | Kelly, Jr. et al. | |
| 5,335,269 A | 8/1994 | Steinlicht | 379/266 |
| 5,390,243 A | 2/1995 | Casselman et al. | |
| 5,436,965 A | 7/1995 | Grossman et al. | |
| 5,444,774 A | 8/1995 | Friedes | |
| 5,467,391 A | 11/1995 | Donaghue, Jr. et al. | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,499,291 A | 3/1996 | Kepley | |
| 5,500,795 A | 3/1996 | Powers et al. | |
| 5,504,894 A | 4/1996 | Ferguson et al. | |
| 5,506,898 A | 4/1996 | Costantini et al. | 379/266 |
| 5,530,744 A | 6/1996 | Charalambous et al. | |
| 5,537,470 A | 7/1996 | Lee | 379/266 |
| 5,537,542 A | 7/1996 | Eilert et al. | |
| 5,544,232 A | 8/1996 | Baker et al. | |
| 5,546,452 A | 8/1996 | Andrews et al. | 379/219 |
| 5,555,299 A | 9/1996 | Maloney et al. | |
| 5,577,169 A | 11/1996 | Prezioso | |
| 5,592,378 A | 1/1997 | Cameron et al. | 395/227 |
| 5,592,542 A | 1/1997 | Honda et al. | |
| 5,594,726 A | 1/1997 | Thompson et al. | 370/485 |
| 5,603,029 A | 2/1997 | Aman et al. | |
| 5,604,892 A | 2/1997 | Nuttall et al. | |
| 5,606,361 A | 2/1997 | Davidsohn et al. | 348/14 |
| 5,611,076 A | 3/1997 | Durflinger et al. | |
| 5,627,884 A | 5/1997 | Williams et al. | 379/67 |
| 5,642,515 A | 6/1997 | Jones et al. | |
| 5,673,205 A | 9/1997 | Brunson | |
| 5,684,872 A | 11/1997 | Flockhart et al. | 379/266 |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,721,770 A | 2/1998 | Kohler | |
| 5,724,092 A | 3/1998 | Davidsohn et al. | 348/14 |
| 5,740,238 A | 4/1998 | Flockhart et al. | 379/221 |
| 5,742,675 A | 4/1998 | Kilander et al. | |
| 5,742,763 A | 4/1998 | Jones | |
| 5,748,468 A | 5/1998 | Notenboom et al. | |
| 5,749,079 A | 5/1998 | Yong et al. | |
| 5,751,707 A | 5/1998 | Voit et al. | 370/384 |
| 5,752,027 A | 5/1998 | Familiar | |
| 5,754,639 A | 5/1998 | Flockhart et al. | 379/221 |
| 5,754,776 A | 5/1998 | Hales et al. | |
| 5,754,841 A | 5/1998 | Carino, Jr. | |
| 5,757,904 A | 5/1998 | Anderson | |
| 5,781,614 A | 7/1998 | Brunson | |
| 5,784,452 A | 7/1998 | Carney | |
| 5,787,410 A | 7/1998 | McMahon | |
| 5,790,642 A * | 8/1998 | Taylor et al. | 379/114.02 |
| 5,790,650 A | 8/1998 | Dunn et al. | |
| 5,790,677 A | 8/1998 | Fox et al. | 380/24 |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,802,510 A | 9/1998 | Jones | |
| 5,818,907 A | 10/1998 | Maloney et al. | 379/34 |
| 5,819,084 A | 10/1998 | Shapiro et al. | |
| 5,825,869 A | 10/1998 | Brooks et al. | 379/265 |
| 5,826,039 A | 10/1998 | Jones | |
| 5,828,747 A | 10/1998 | Fisher et al. | 379/309 |
| 5,836,011 A | 11/1998 | Hambrick et al. | |
| 5,838,968 A | 11/1998 | Culbert | |
| 5,839,117 A | 11/1998 | Cameron et al. | 705/27 |
| 5,864,874 A | 1/1999 | Shapiro | |
| 5,875,437 A | 2/1999 | Atkins | 705/40 |
| 5,880,720 A | 3/1999 | Iwafune et al. | 345/327 |
| 5,881,238 A | 3/1999 | Aman et al. | |
| 5,884,032 A | 3/1999 | Bateman et al. | 395/200.34 |
| 5,889,956 A | 3/1999 | Hauser et al. | |
| 5,897,622 A | 4/1999 | Blinn et al. | 705/26 |
| 5,903,641 A | 5/1999 | Tonisson | 379/266 |
| 5,903,877 A | 5/1999 | Berkowitz et al. | 705/26 |
| 5,905,793 A | 5/1999 | Flockhart et al. | 379/266 |
| 5,909,669 A | 6/1999 | Havens | |
| 5,911,134 A | 6/1999 | Castonguay et al. | |
| 5,914,951 A | 6/1999 | Bentley et al. | |
| 5,915,012 A | 6/1999 | Miloslavsky | |
| 5,923,745 A | 7/1999 | Hurd | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandit | |
| 5,940,496 A | 8/1999 | Gisby et al. | |
| 5,943,416 A | 8/1999 | Gisby | 379/265 |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | 379/266 |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | 364/479.02 |
| 6,011,844 A | 1/2000 | Uppaluru et al. | |
| 6,014,437 A | 1/2000 | Acker et al. | |
| 6,031,896 A | 2/2000 | Gardell et al. | |
| 6,038,293 A | 3/2000 | Mcnerney et al. | |
| 6,038,296 A | 3/2000 | Brunson et al. | |
| 6,044,144 A | 3/2000 | Becker et al. | |
| 6,044,205 A | 3/2000 | Reed et al. | 395/200.31 |
| 6,044,355 A | 3/2000 | Crockett et al. | |
| 6,049,547 A | 4/2000 | Fisher et al. | 370/412 |
| 6,049,779 A | 4/2000 | Berkson | |
| 6,052,723 A | 4/2000 | Ginn | |
| 6,055,308 A | 4/2000 | Miloslavsky et al. | |
| 6,064,730 A | 5/2000 | Ginsberg | 379/265 |
| 6,064,731 A | 5/2000 | Flockhart et al. | 379/265 |
| 6,084,954 A | 7/2000 | Harless et al. | 379/140 |
| 6,088,441 A | 7/2000 | Flockhart et al. | 379/265 |
| 6,108,670 A | 8/2000 | Weida et al. | |
| 6,115,462 A | 9/2000 | Servi et al. | |
| 6,128,304 A | 10/2000 | Gardell et al. | |
| 6,151,571 A | 11/2000 | Pertrushin | 704/209 |
| 6,154,769 A | 11/2000 | Cherkasova et al. | |
| 6,163,607 A | 12/2000 | Bogart et al. | 379/266 |
| 6,173,053 B1 * | 1/2001 | Bogart et al. | 379/266.01 |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,185,603 B1 | 2/2001 | Henderson et al. | |
| 6,192,122 B1 | 2/2001 | Flockhart et al. | 379/266 |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | 700/264 |
| 6,263,359 B1 | 7/2001 | Fong et al. | |
| 6,272,544 B1 | 8/2001 | Mullen | |
| 6,275,806 B1 | 8/2001 | Pertrushin | 704/272 |
| 6,275,812 B1 | 8/2001 | Haq et al. | |
| 6,275,991 B1 | 8/2001 | Erlin | 725/141 |
| 6,278,777 B1 | 8/2001 | Morley et al. | 379/265 |
| 6,292,550 B1 | 9/2001 | Burritt | 379/201 |
| 6,295,353 B1 | 9/2001 | Flockhart et al. | 379/265 |
| 6,298,062 B1 | 10/2001 | Gardell et al. | |
| 6,307,931 B1 | 10/2001 | Vaudreuil | |
| 6,324,282 B1 | 11/2001 | McIllwaine et al. | |
| 6,332,081 B1 | 12/2001 | Do | |
| 6,339,754 B1 | 1/2002 | Flanagan et al. | |
| 6,353,810 B1 | 3/2002 | Petrushin | 704/236 |
| 6,356,632 B1 | 3/2002 | Foster et al. | |
| 6,360,222 B1 | 3/2002 | Quinn | |
| 6,366,666 B2 | 4/2002 | Bengtson et al. | |
| 6,366,668 B1 | 4/2002 | Borst et al. | 379/266.04 |
| 6,389,028 B1 | 5/2002 | Bondarenko et al. | 370/401 |
| 6,389,132 B1 | 5/2002 | Price et al. | 379/265 |

| | | | |
|---|---|---|---|
| 6,389,400 B1 | 5/2002 | Bushey et al. .................... 705/7 |
| 6,408,066 B1 | 6/2002 | Andruska et al. |
| 6,408,277 B1 | 6/2002 | Nelken |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin ...................... 704/273 |
| 6,430,282 B1 | 8/2002 | Bannister et al. ........ 379/211.02 |
| 6,434,230 B1 | 8/2002 | Gabriel |
| 6,446,092 B1 | 9/2002 | Sutter |
| 6,449,356 B1 | 9/2002 | Dezonno ................. 379/265.01 |
| 6,449,358 B1 | 9/2002 | Anisimov et al. |
| 6,449,646 B1 | 9/2002 | Sikora et al. |
| 6,453,038 B1 | 9/2002 | McFarlane et al. ...... 379/265.05 |
| 6,463,148 B1 | 10/2002 | Brady |
| 6,463,346 B1 | 10/2002 | Flockhart et al. ............. 700/102 |
| 6,463,415 B2 | 10/2002 | St. John ...................... 704/273 |
| 6,463,471 B1 | 10/2002 | Dreke et al. |
| 6,480,826 B2 | 11/2002 | Pertrushin ...................... 704/270 |
| 6,490,350 B2 | 12/2002 | McDuff et al. |
| 6,535,600 B1 | 3/2003 | Fisher et al. ............. 379/265.12 |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. ......... 370/352 |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,662,188 B1 | 12/2003 | Rasmussen et al. |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,988 B1 * | 9/2005 | Saleh ........................... 709/226 |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 * | 5/2006 | Borodow et al. ......... 379/265.02 |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,136,873 B2 | 11/2006 | Smith et al. |
| 7,149,733 B2 | 12/2006 | Lin et al. |
| 7,155,612 B2 | 12/2006 | Licis |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 * | 1/2007 | Knott et al. ............. 379/265.06 |
| 7,177,401 B2 | 2/2007 | Mundra et al. |
| 7,200,219 B1 | 4/2007 | Edwards et al. |
| 7,212,625 B1 | 5/2007 | McKenna et al. |
| 7,215,744 B2 | 5/2007 | Scherer |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,299,259 B2 | 11/2007 | Petrovykh |
| 7,324,954 B2 * | 1/2008 | Calderaro et al. ............. 705/10 |
| 7,340,408 B1 * | 3/2008 | Drew et al. ................... 705/10 |
| 7,373,341 B2 | 5/2008 | Polo-Malouvier |
| 7,376,127 B2 | 5/2008 | Hepworth et al. |
| 7,386,100 B2 | 6/2008 | Michaelis |
| 7,392,402 B2 | 6/2008 | Suzuki |
| 7,418,093 B2 * | 8/2008 | Knott et al. ............. 379/265.06 |
| 7,499,844 B2 | 3/2009 | Whitman, Jr. |
| 7,545,925 B2 | 6/2009 | Williams |
| 7,885,209 B1 | 2/2011 | Michaelis et al. |
| 2001/0011228 A1 * | 8/2001 | Shenkman ...................... 705/14 |
| 2001/0034628 A1 | 10/2001 | Eder |
| 2001/0056349 A1 | 12/2001 | St. John ........................ 704/270 |
| 2001/0056367 A1 | 12/2001 | Herbert et al. |
| 2002/0002460 A1 | 1/2002 | Pertrushin ...................... 704/270 |
| 2002/0002464 A1 | 1/2002 | Petrushin ...................... 704/275 |
| 2002/0010587 A1 | 1/2002 | Pertrushin ...................... 704/275 |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0118816 A1 | 8/2002 | Flockhart et al. ........ 379/265.12 |
| 2002/0123923 A1 * | 9/2002 | Manganaris et al. ........... 705/10 |
| 2002/0147730 A1 | 10/2002 | Kohno |
| 2002/0181692 A1 | 12/2002 | Flockhart et al. ........ 379/265.02 |
| 2002/0194002 A1 | 12/2002 | Petrushin ...................... 704/270 |
| 2002/0194096 A1 * | 12/2002 | Falcone et al. .................. 705/35 |
| 2003/0004704 A1 | 1/2003 | Baron |
| 2003/0014491 A1 | 1/2003 | Horvitz et al. |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |
| 2003/0123642 A1 | 7/2003 | Alvarado et al. |
| 2003/0144900 A1 | 7/2003 | Whitmer |
| 2003/0144959 A1 | 7/2003 | Makita |
| 2003/0152212 A1 | 8/2003 | Burok et al. |
| 2003/0174830 A1 | 9/2003 | Boyer et al. |
| 2003/0177017 A1 | 9/2003 | Boyer et al. |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1 | 9/2004 | Cuckson et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |

| | | |
|---|---|---|
| 2004/0210475 A1 | 10/2004 | Starnes et al. |
| 2004/0240659 A1 | 12/2004 | Gagle et al. |
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0027612 A1 | 2/2005 | Walker et al. |
| 2005/0043986 A1 | 2/2005 | McConnell et al. |
| 2005/0044375 A1 | 2/2005 | Paatero et al. |
| 2005/0047578 A1* | 3/2005 | Knott et al. ............... 379/265.06 |
| 2005/0049911 A1* | 3/2005 | Engelking et al. ............... 705/11 |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0228707 A1* | 10/2005 | Hendrickson ............... 705/8 |
| 2005/0261035 A1 | 11/2005 | Groskreutz et al. |
| 2005/0283393 A1 | 12/2005 | White et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1* | 2/2006 | Joseph et al. ............... 705/8 |
| 2006/0056598 A1 | 3/2006 | Brandt et al. |
| 2006/0058049 A1 | 3/2006 | McLaughlin et al. |
| 2006/0100973 A1 | 5/2006 | McMaster et al. |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbarth, et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0121892 A1* | 5/2007 | Knott et al. ............... 379/265.01 |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |

FOREIGN PATENT DOCUMENTS

| | | |
|---|---|---|
| CA | 2174762 | 6/1995 |
| EP | 0 501 189 A2 | 9/1992 |
| EP | 0576205 | 12/1993 |
| EP | 0 740 450 A2 | 10/1996 |
| EP | 0 772 335 A2 | 5/1997 |
| EP | 0770967 | 5/1997 |
| EP | 0 829 996 A2 | 3/1998 |
| EP | 0 855 826 A2 | 7/1998 |
| EP | 0 863 651 A2 | 9/1998 |
| EP | 0 866 407 A1 | 9/1998 |
| EP | 899673 A2 | 3/1999 |
| EP | 998108 A1 | 5/2000 |
| EP | 1035718 | 9/2000 |
| EP | 1091307 A2 | 4/2001 |
| EP | 1150236 | 10/2001 |
| EP | 1761078 | 3/2007 |
| GB | 2 273 418 | 6/1994 |
| GB | 2 290 192 A | 12/1995 |
| JP | 07-007573 | 1/1995 |
| JP | 2001-053843 | 2/2001 |
| JP | 2002-032977 | 1/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | WO 03/015425 | 2/2003 |

OTHER PUBLICATIONS

Venkatesan, Rajkumar and Kumar, V. A Customer Lifetime Value Framework for Customer Selection and Resource Allocation Strategy. Journal of Marketing. vol. 68 (Oct. 2004), pp. 106-125.*

Doo-Hyun Kim et al. "Collaborative Multimedia Middleware Architecture and Advanced Internet Call Center"; ProceedingsInternational Conference on Information Networking (Jan. 31, 2001), pp. 246-250.

Presentation by Victor Zue, *The Mit Ox90ygen Project*, MIT Laboratory for Computer Science (Apr. 25-26, 2000).

MIT Protect Oxygen, *Pervasive, Human-Centered Computing* (MIT Laboratory for Computer Science) (Jun. 2000).

E. Noth et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps.gz.

L.F. Lamel and J.L. Gauvain, *Language Identification Using Phone-Based Acoustic Likelihoods*, ICASSP-94, 4 pages.

John H.L. Hansen and Levent M. Arslan, *Foreign Accent Classificatino Using Source Generator Based Prosodic Features*, IEEE Proc. ICASSP, vol. 1, pp. 836-839, Detroit USA (May 1995).

Levent M. Arslan and John H.L. Hansen, *Language Accent Classification in American English*, Robust Speech Processing Laboratory, Duke University Department of Electrical Engineering, Durham, NC, Technical Report RSPL-96-7, revised Jan. 29, 1996.

Levent M. Arslan, *Foreign Accent Classification in American English*, Department of Electrical Computer Engineering, Duke University, Thesis, pp. 1-200 (1996).

No Author, "When Talk Isn't Cheap" Sm@rt Reseller, v. 3, n. 13 (Apr. 3, 2000), p. 50.

No Author, "eGain's Commerce 2000 Platform Sets New Standard for eCommerce Customer Communications" Business Wire (Nov. 15, 1999).

Definity Communications System Generic 3 Call Vectoring-Expert Agent Selection (EAS) Guide, AT&T publication No. 555-230-520 (Issue 3, Nov. 1993).

U.S. Appl. No. 09/235,065, Denton et al.

U.S. Appl. No. 10/683,039, filed Oct. 10, 2003, Flockhart et al.

Microsoft Office Animated Help Tool.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

Avaya, Inc. Business Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya, Inc. 2003.

Avaya, Inc. CentreVu Advocate, Release 9, User Guide, Dec. 2000.

"Internet Protocol Addressing," available at http://samspade.org/d/ipdns.html, downloaded Mar. 31, 2003, 9 pages.

"Domain Name Services," available at http://www.pism.com/chapt09/chapt09.html, downloaded Mar. 31, 2003, 21 pages.

Bellsouth Corp, "Frequently Asked Questions-What is a registrar?," available at https://registration.bellsouth.net/NASApp/DNSWebUI/FAQ.jsp, downloaded Mar. 31, 2003, 4 pages.
S. Ahmed, "A Scalable Byzantine Fault Tolerant Secure Domain Name System," thesis submitted to MIT Dept of Electrical Engineering & Computer Science, Jan. 22, 2001, 101 pages.
Coles, Scott, "A Guide for Ensuring Service Quality in IP Voice Networks," Avaya, Inc., 2002, pp. 1-17.
Avaya, Inc., "The Advantages of Load Balancing in the Multi-Call Center Enterprise," Avaya, Inc., 2002, 14 pages.
Chavez, David, et al., "Avaya MultiVantage Software: Adapting Proven Call Processing for the Transition to Converged IP Networks," Avaya, Inc., Aug. 2002.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
Stevenson et al.; "Name Resolution in Network and Systems Management Environments"; http://netman.cit.buffalo.edu/Doc/DStevenson/NR-NMSE.html; 16 pages.
"Still Leaving It to Fate?: Optimizing Workforce Management", Durr, William Jr., Nov. 2001.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 11/087,290, filed Mar. 22, 2005, Michaelis.
6,537,685, Mar. 2003, Fisher et al. (patent withdrawn).
Kimball, et al., "Practical Techniques for Extracting, Cleaning, Conforming, and Delivering Data." The Data Warehouse ETL Toolkit. 2004. Ch. 5, pp. 170-174.
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/571,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
Snape, James, "Time Dimension and Time Zones." 2004. pp. 1-10. http://www.jamessnape.me.uk/blog/CommentView,gui,79e910a1-0150-4452-bda3-e98d.
Data Warehouse Designer—Divide and Conquer, Build Your Data Warehouse One Piece at a Time, Ralph Kimball, Oct. 30, 2002, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Two: Drilling Across, Ralph Kimball, Apr. 5, 2003, 3 pages.
Data Warehouse Designer—The Soul of the Data Warehouse, Part Three: Handling Time, Ralph Kimball, Apr. 22, 2003, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Multi-Dimensional Modeling with BW ASAP for BW Accelerator Business Information Warehouse, copyright 2000, 71 pages.
Kimball, et al., "The Complete Guide to Dimensional Modeling." The Data Warehouse Toolkit. 2nd Edition, 2002. Ch. 11, pp. 240-241.
The Importance of Data Modeling as a Foundation for Business Insight, Larissa Moss and Steve Hoberman, copyright 2004, 38 pages.
Data Warehouse Designer Fact Tables and Dimension, Jan. 1, 2003, http://www.inteeigententerprise.com/030101/602warehouse1_1.jhtml, Ralph Kimball, 3 page.
Data Warehouse—Surrogate Keys, Keep Control Over Record Identifiers by Generating New Keys for the Data Warehouse, Ralph Kimball, May 1998, 4 pages.
Data Warehouse Designer—An Engineer's View—Its' Worthwhile to Remind Ourselves Why We Build Data Warehouses the Way We Do, Ralph Kimball, Jul. 26, 2002, 3 pages.
Data Warehouse Designer—Design Constraints and Unavoidable Realities, No design Problem in School was This Hard, Ralph Kimball, Sep. 3, 2002, 3 pages.
Data Warehouse Designer—Two Powerful Ideas, The Foundation for Modern Data Warehousing, Ralph Kimball, Sep. 17, 2002, 3 pages.
Avaya—"Avaya and Blue Pumpkin—Providing Workforce Optimization Solutions" (Copyright 2004) (3 pages).

Avaya —"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Multi Channel Product Authorization," (PA) Version 5.0, (Nov. 2003) (6 pages).
Nortel—"Centrex Internet Enabled Call Centers," http://www.products.nortel.com/go/product_assoc.jsp?segld=0&parID=0&catID=-9191&rend_id... (Copyright 1999-2005) (1 page).
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Atkins et al; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Bill Michael, "The Politics of Naming" www.cConvergence.com (Jul. 2001) pp. 31-35.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
E. Veerman, "Designing a Dimensional Model", date unknown, 38 pages.
G. Wiederhold, "Mediation to Deal with Heterogeneous Data Sources", Stanford University, Jan. 1999, 19 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
J.E. Bentley, "Metadata: Everyone Talks About It, But What Is It?", First Union National Bank, date unknown, 5 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Sugano et al.;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Andy Zmolek; "SIMPLE and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Background of the Invention for the above-captioned application (previously provided).
U.S. Appl. No. 12/193,542, filed Aug. 18, 2008, Olson.

U.S. Appl. No. 12/242,916, filed Oct. 1, 2008, Kiefhaber et al.
"Learn the structure of an Access database", available at http://office.microsoft.com/en-us/access/HA012139541033.aspx, site updated Nov. 13, 2007, pp. 1-4.
Dillion, "Renaming fields and tracing dependencies", available at http://allenbrowne.com/ser-41.html, Nov. 2003, updated May 2006, 1 page.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Sarda, "Temporal Issues in Data Warehouse Systems", 1999, Database Applications in Non-Traditional Environments (DANTE'99), S. 27, DOI: 10.1109/DANTE.1999.844938.
U.S. Appl. No. 11/242,687, filed Oct. 3, 2005, Krimstock et al.
U.S. Appl. No. 10/815,566, filed Mar. 31, 2004, Kiefhaber.
Bischoff et al. "Data Ware House Building Method—practical advices telled by persons having experience and experts", Kyouritsu Shuppan Corp. May 30, 2000, first edition, pp. 197-216.
Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.
Koutarou, "Building a Framework for EC using Hibernate, OSWorkflow", JAVA Press, Japan, Gujutsu Hyouron Company, vol. 25, 2004, pp. 132-147.
Microsoft R Access 97 for Windows R Application development guide, Ver. 8.0, Microsoft Corp., A first version, pp. 569-599.
Akitsu, "An Introduction of Run Time Library for C Program, the fourth round," C Magazine, Jul. 1, 1990, vol. 2(7), pp. 78-83.
Emura, "Windows API Utilization Guide, Points for Knowledges and Technologies," C Magazine, Oct. 1, 2005, vol. 17(10), pp. 147-150.
Examiner's Office Letter (including translation) for Japanese Patent Application No. 2007-043414, mailed Jul. 7, 2010.
Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom..., 1 page.
Overview of Avaya IP Softphone printed on Sep. 15, 2009 from http://support.avaya.com/elmodocs2/ip_softphone/Overview_IP_Softphone_R6.htm, 2 pages.
U.S. Appl. No. 12/569,581, filed Sep. 29, 2009, filed Sep. 29, 2009, Michaelis.
Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age..., 1 page.
Product Description of "Avaya one-X Agent," printed on Sep. 15, 2009 from http://www.avaya.com/usa/product/avaya-one-x-agent, 1 page.
Product Overview of "IP Softphone" printed on Sep. 15, 2009 from http://www.nacr.com/Products.aspx?id=236, 3 pages.

* cited by examiner

USING TRUE VALUE IN ROUTING WORK ITEMS TO RESOURCES

FIELD OF THE INVENTION

The present invention is directed generally to servicing a contactor in a contact center and specifically to routing or directing contacts to appropriate contact center resources.

BACKGROUND OF THE INVENTION

Contact centers, such as Automatic Contact Distribution or ACD systems, are employed by many enterprises to service customer contacts. A typical contact center includes a switch and/or server to receive and route incoming packet-switched and/or circuit-switched contacts to one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability contacted contact vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

Most present-day contact-distribution algorithms focus on being "fair" to contacters and to agents. This fairness is reflected by the standard first-in, first-out contact to most-idle-agent assignment algorithm. Skills-based routing improves upon this basic algorithm in that it allows each agent to be slotted into a number of agent groups based on the agent's skill types and levels.

The primary objective of contact-distribution algorithms is to ultimately maximize contact center performance and profitability. That may involve minimizing cost, maximizing contact throughput, and/or maximizing revenue, among others. For example, when a new contact arrives, the contact should be handled by an agent who either has the ability to produce the most revenue or can handle the contact in the shortest amount of time. Also, when an agent becomes available to handle a new contact, the agent should handle either the contact that has the possibility of generating the most revenue or the contact which the agent is most efficient in handling.

Although current algorithms, including skills-based routing algorithms, attempt to determine and assign a value to a customer contacting the contact center to better service the customer, the value is typically associated with an estimate of gross revenue based on historical revenue realized from contact center interaction with the customer. The estimate of historical revenue, however, fails to reflect the true value of the customer to the contact center. For example, if a first customer uses low cost contact center resources and/or media to purchase a product he or she may be treated the same as or worse than a second customer who uses much higher cost contact center resource(s) or media to purchase a slightly higher value product. This disparity results from the fact that profit margin(s) associated with sales to the customer are not taken into account. If the contact center had a real sense of the value of a particular customer to the business serviced by the contact center and used that information to decide how to handle interactions with that customer, the contact center could maximize the efficiency and effectiveness of those interactions, thereby maximizing customer satisfaction and sales revenue to the business.

SUMMARY OF THE INVENTION

These and other needs are addressed by the various embodiments and configurations of the present invention. The present invention is directed generally to the use of a monetary cost or expense to determine a value of a customer and/or contact to a contact center and/or to the prediction of sales volume from a customer using historic sales volume information from this and other similar customers. "Value" can be implemented as a cost and/or revenue-generating metric depending on the application.

In one embodiment, the present invention is directed to a method for servicing a contact that includes the steps of:

(a) receiving a first contact from a first customer, the first customer and/or first contact having an associated first value to the contact center and (b) selecting a resource of the contact center to service the first contact based, at least in part, on the first value.

The first value preferably reflects one or more of (i) a monetary expense of the contact center to service the first customer or first contact and (ii) a predicted sales volume that may be realized by the contact center from the first customer or first contact. The predicted sales volume can be based, at least in part, on a historic sales volume realized by the contact center from the first and/or a second, typically similar, customer.

A contact can be a real-time or non-real-time contact. A real-time contact refers to a contact in which the contacting entity or customer is present during the waiting (or queuing) period and can choose to abandon or disconnect the contact if the contact is not serviced within an acceptable period. Common examples include voice contacts, VoIP, text-chat, video contacts, and the like. A non-real-time contact refers to a contact in which the contacting entity or customer is unable to abandon or disconnect the contact. Common examples include e-mail, fax, electronic or paper documents, webform submissions, voice messages, and the like.

As will be appreciated, resource can be a human agent or automated resource, such as an IVR, web server, FAX-back application, voice messaging server, and the like.

The monetary expense can include fixed and/or variable, direct and/or indirect, overhead and/or operating costs. The monetary expense can be historic (or the cost to service a prior contact with the customer), predicted (or the predicted cost to service a future contact with the customer), and/or current (or the cost to service a current contact (waiting to be serviced by a selected resource or set of resource(s)) with the customer). The expense can be a contact expense, such as an expense of a resource or set of resources to service one or more selected contacts. The expenses include such items as agent salary and benefits, agent training costs, contact center operating, capital, and overhead costs, fixed and variable costs, contact media costs, cost of goods sold, cost of returns, cost of order processing, cost of shipping and sales costs.

The value can reflect historic customer sales (or the sales from prior contacts with the customer), predicted customer sales (or the predicted sales from one or more future contacts with the customer) and/or current customer sales (or the sales potentially realizable from a current contact (waiting to be serviced by a selected resource or set of resource(s))).

In one configuration, the value is a per contact value calculated based on the expected revenues from the current contact less the expected costs for the current contact less the average contact expense directly attributable to the customer making the contact. The expected revenues, expected costs, and average contact expense can be based on the sales/cost information of a set of similar customers, the current customer, and/or a combination thereof. The value can exclude expense items that are not caused by the customer, such as returns, service contacts, and the like. Typically, overhead or indirect expenses are excluded from expected costs and average contact expenses as they are not attributable directly to the customer.

In another configuration, the value is a customer value based on the expected revenues from the current customer less the expected costs for the current customer less the average contact expenses for the current customer. The expected revenues, expected costs, and average contact expenses can be based on a group of similarly situated customers, the customer, or a combination thereof. The value is not on a per-contact basis.

Compared to conventional contact centers, the present invention can provide a far more accurate measure of customer value than is currently in use. The use of a more accurate measure of customer value can provide higher levels of contact center efficiency, valued customer satisfaction, sales revenue, and profitability. The present invention uses already available accounting information to estimate the contact center expenses associated with servicing a customer. The value can be updated automatically with each customer interaction, combining the business result of the interaction with the interaction expense to be used to determine the routing of the next interaction with that customer.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
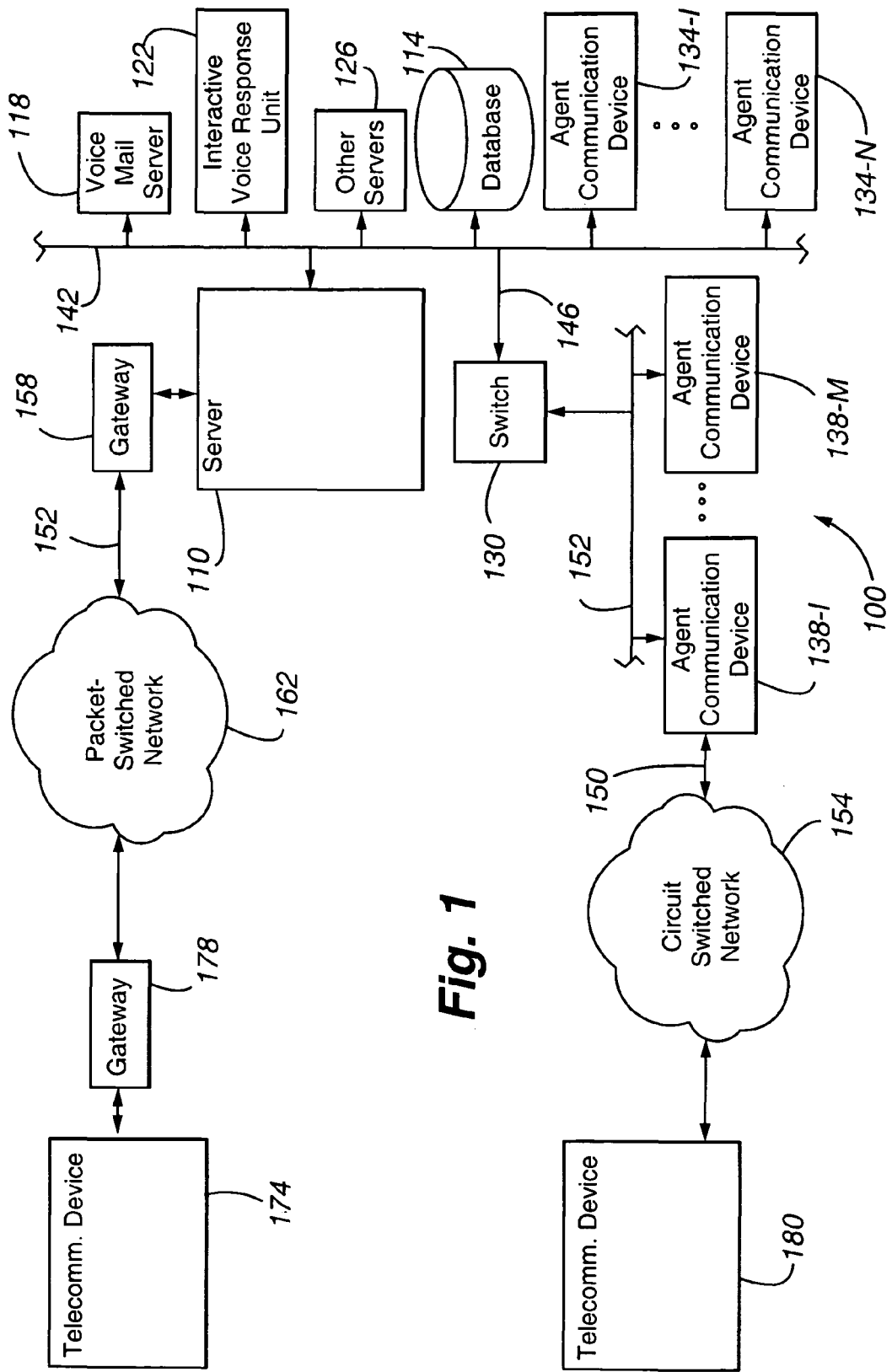
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

Figure 2:
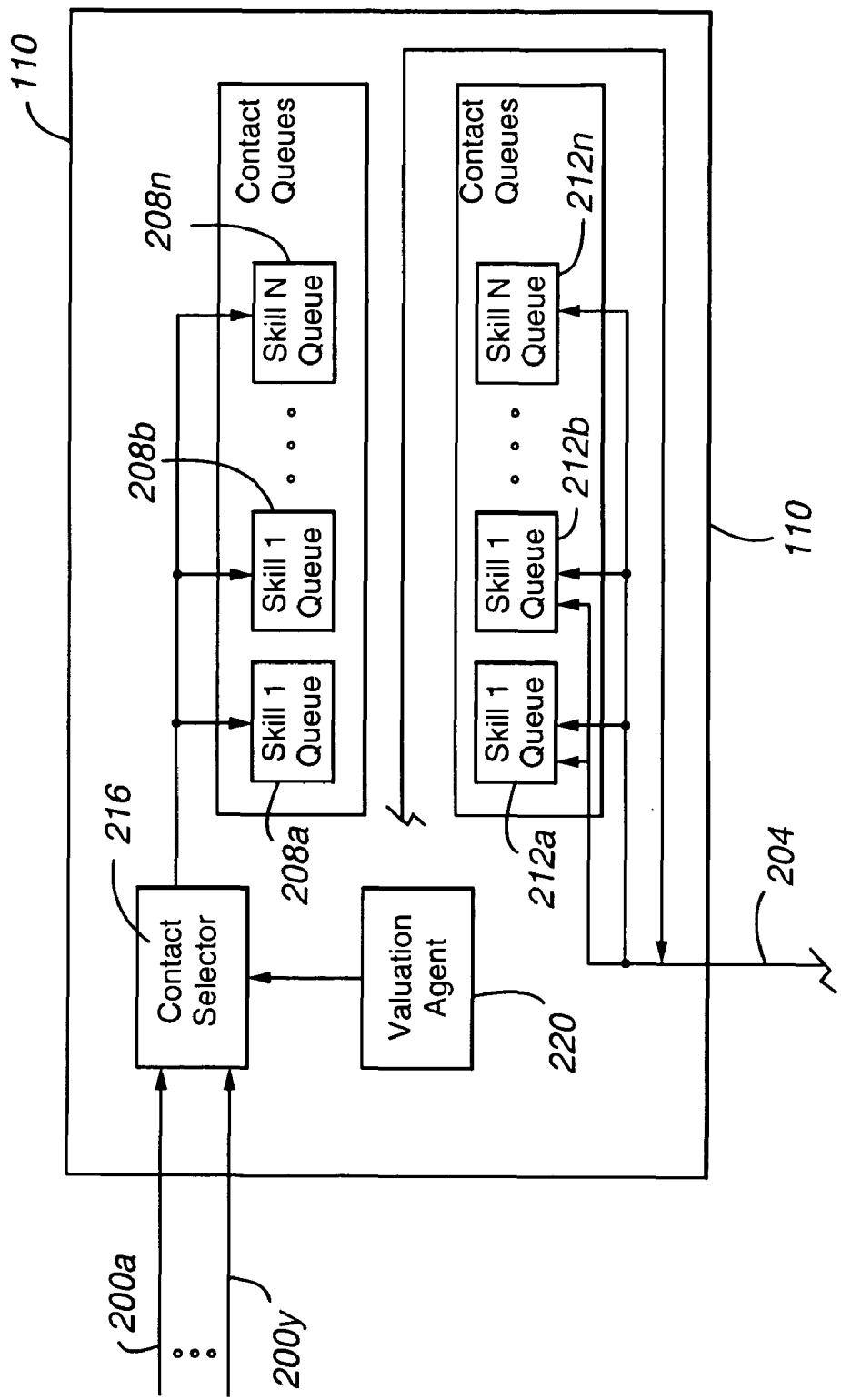
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Contact Management System (not shown) and a Contact Management System (not shown) that gathers contact records and contact-center statistics for use in generating contact-center reports.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, and/or S8300™ media server and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact selector 216. Contacts incoming to the contact center are assigned by contact selector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels.

Referring to FIG. 1, the gateway 158 can be Avaya Inc.'s, G700 Media Gateway™ and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the contact selector 216 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the invention, included among the programs executing on the server 110 is a valuation agent 220 and a contact selector 216. The agent 220 estimates a true value of a pending customer contact and typically updates this value after each contact with the customer is completed. The selector 216 uses predefined criteria, particularly contact value, in selecting an appropriate queue 208a-n and/or a priority or position in the queue at which to locate the contact until serviced by an agent and/or a specific agent to service the contact. The contact value can not only reflect historic revenue associated with the customer or potential revenue associated with the current and/or future contacts by the customer but also adjust the revenue to reflect fixed and/or variable costs associated with the servicing of the prior, current, and/or future revenue and/or non-revenue generating contact(s).

In a preferred configuration, the customer value is a measure of the net profit/loss realized from the customer over a selected period of time. As will be appreciated, the net profit/loss is the gross revenue or sales less the applicable costs. The measure is preferably determined using the following equation:

True value of current contact=expected revenues−expected costs−average expense directly attributed to the customer responsible for the contact.

The expected revenues for the customer responsible for the contact can be determined using any suitable technique. For example, the expected revenue can be based on a weighted average historical revenue for this transaction type for a set of customers and/or for all transaction types for this particular customer. The weighted average historical revenue for this transaction type can be based on revenue received from all customers, a set of similar customers, and/or only this customer. The transaction type can be defined narrowly or broadly depending on the application. The criteria defining sets of similar customers can vary by application but typically include historic revenue generation levels, socioeconomic status, geographic location, and the like. Typically, the weighted average historical revenue for this transaction type is used when the current customer is unknown (or has not yet established a sufficient transaction history with the contact center) while the weighted average historical revenue for all transaction types for this customer is used when the current customer is known (or has established a sufficient transaction history with the contact center). The expected revenues are typically divided by the number of revenue-generating contacts for a particular set of transaction types or all transaction types for this customer to express revenue on a per-contact basis.

The expected costs can be determined by any suitable technique. Typically, the expected costs are determined by a weighted average historical cost for this transaction type or all transaction types for this customer. The cost items or cost centers used in determining the weighted average historical cost can include direct and indirect costs, such as cost of goods sold, agent compensation based on length of time responding to the contact, returns, and distribution that are tracked for the business (and often broken down by department). These costs are associated with selling to and servicing a particular customer. Preferably, the overhead (or indirect) expenses (that are not attributable directly to a customer or contact), such as rent, equipment, and the like, are considered as a cost of doing business and are not included in the expected costs or average expense calculations. Typically, the expected costs for a set of transaction types is used when the current customer is unknown (or has not yet established a sufficient transaction history with the contact center) while the expected cost for all transaction types for this customer is used when the current customer is known (or has established a sufficient transaction history with the contact center).

The expected costs are typically expressed as a contact expense or on a per-contact basis. As used herein, "contact expense" refers to the fixed and/or variable overhead and operating expenses allocable to a selected contact and/or selected time interval of the servicing resource's time (e.g., minute). In a preferred embodiment, the contact expense is based on the number of revenue generating contacts for a particular set of transaction types and/or for all transaction types.

There are many techniques for determining the contact expense. The simplest and least accurate technique is for the contact expense to be the average or median contact expense for all contacts (whether sales or service-type contacts) serviced by all agents of the contact center by all media types (e.g., voice, email, instant messaging, web chat, voice messaging, FAX, IVR, and the like). The contact expense can be the average or median contact expense for a specific skill or for all contacts serviced by a specific set of resources and/or using a specific medic-type. The specific set of resources can be defined by skill, agent queue, expertise level, and/or media-type. The contact expense can be the average or median contact expense for a specific resource, such as a human agent, and reflect cost centers, such as the agent's salary, optionally allocable share of overhead, equipment cost, training costs, and the like. Overhead and other indirect costs are generally not considered in computing the value as they do not vary based on a customer's behavior. When considered, the overhead can be the overhead from the business as a whole, a department of the business, or only the contact center. It typically includes the capital and operating costs for the contact center, such as the capital cost of the software, hardware, and contact center space expense (e.g., rent). The average can be determined over a selected time period, such as 1-month, 6-months, one year, and the like. Typically, the contact expense is determined by dividing the allocable cumulative expenses for the selected resource or set of resource(s) (including out-of-service costs or expenses for periods when the resource is not servicing contacts) by the cumulative number of revenue-generating contacts serviced by the resource or set of resource(s) or cumulative time the resource actually services revenue-generating contacts (excluding out-of-service time).

The average expense directly attributed to this customer can also be determined by any suitable technique. This expense item is generally intended to reflect customer-specific expenses that are not otherwise considered in the expected expenses. Examples include marketing, general and administrative, sales and service, plant and equipment, research and development, the length of time that the customer ties up an agent, the expense of servicing this customer (e.g., the customer buys a large order and sends most of it back or spends hours on the phone talking to customer service to figure out how to use a product), etc. For unknown customers, this expense item may be omitted. This expense item can be omitted when necessary to avoid double inclusion of expenses. This may occur where the expected expenses are based solely on the current contacting customer's actual history. Typically, the average expense is determined by dividing the total expense directly attributable to the particular customer over a specified time period (such as X months) less adjustments by the number of revenue generating contacts over the last X months. The adjustments refer to expenses attributed to the customer that are not caused by the customer (e.g., product defects or recontacts). It is often undesirable for such expenses to adversely impact the contact's true value and thereby potentially cause the contact to be provided with a lesser degree of service. For known customers, the average expense is based on the customer's actual history while for unknown customers, the average expense is based on the average expense for a group of similar customers over a specified time period, such as X months.

The weighting approach used for the expected revenues, expected costs, and/or average contact expense can be based on any suitable algorithm. Preferably, the weighting algorithm weighs data from more recent events more heavily than data from less recent events. Weighting may also be used to weigh data for the current customer more heavily than data for similar customers.

In another embodiment, the true value is based not on a contact-by-contact basis but on a customer basis. In that embodiment, the current true value for each customer is determined by multiplying each of the number of contacts (or duration or each contact) from the customer over the selected time period by the corresponding contact expense(s) over that time period and subtracting the resulting expense from the adjusted gross sales revenue realized from the customer and/or a set of similar customers during that time period. The gross sales revenue can be adjusted by the profit margin(s) on the customer-purchased products. The general equation for determination of current true customer value is:

True Customer Value=total expected revenue realized from the current customer over specified time period−total expected costs for the customer over the specified time period−total contact expenses for the customer over the specified time period.

Unlike the true contact value of the previous embodiment, true customer value is not on a per-contact basis but is a gross figure for all contacts with the customer over a specified period.

A lifetime true value of a customer may be used, where the time period varies from customer-to-customer. For example, the true value of a first customer who has done business with the contact center for 5 years reflects the gross revenue realized from the customer over that 5-year period and the (annual) contact expense(s) during that 5-year period. The true value of a second customer who has done business with the contact center for only one year reflects the gross revenue realized from the customer over that year and the contact expense during that year. The revenue may be adjusted for inflation. Lifetime value can reflect factors such as demographics.

As will be appreciated, the true value of a customer may include other, less tangible factors that the business deems important. For example, the true value may reflect the customer's visibility in the marketplace, the customer's loyalty (or the length of time the customer has done business with the contact center), and/or the potential future value/sales revenue realizable from the customer. Including these factors into the measurement of true value would allow a business to weight the revenue side with any knowledge they might have of the customer's potential to the business. For example, a customer who has bought a lot in the past may be close to the "wallet" that he or she has available (or close to his or her spending limits), whereas a customer who is buying a small amount now may have a tremendous potential to grow.

The true value may also be adjusted to reflect expenses associated with the customer other than expenses specifically associated with a human agent. For example, the other non-agent expenses can include costs associated with catalog mailings, email messages to the customer, automated contacts to the customers, automated resources such as IVRs, trunks, and the like.

The true value of the customer or contact may not be based on historical sales information but also, or alternatively on, projections of future sales realizable from the customer. The potential value can be determined using demographic and/or socioeconomic information associated with the customer, the valuation agent 220 produces a profile of the customer. The profile typically includes predetermined indicia deemed to be predictive of future sales activity, including customer age, family size and family member ages, income, other financial information, such as savings, investments, and the like, employment status (self-employed, unemployed, or non-self-employed), location of residence, credit rating, outstanding loan balances, credit card information, past buying patterns, and the like. The profile is compared against profiles of other customers to produce a forecast of the potential types and/or volume of purchases from the customer. Depending upon the degree of the match, a confidence level can be associated with the prediction. The level of confidence can be used to weight or otherwise adjust the forecast. The forecast can be updated periodically as more information is gathered about the customer or other customers. The true value may be the sum of historical, current, and predicted future sales activities. The various revenue components may be weighted to reflect their relative importance or the level of confidence that the current or predicted future sales activity is accurate.

Figure 3:
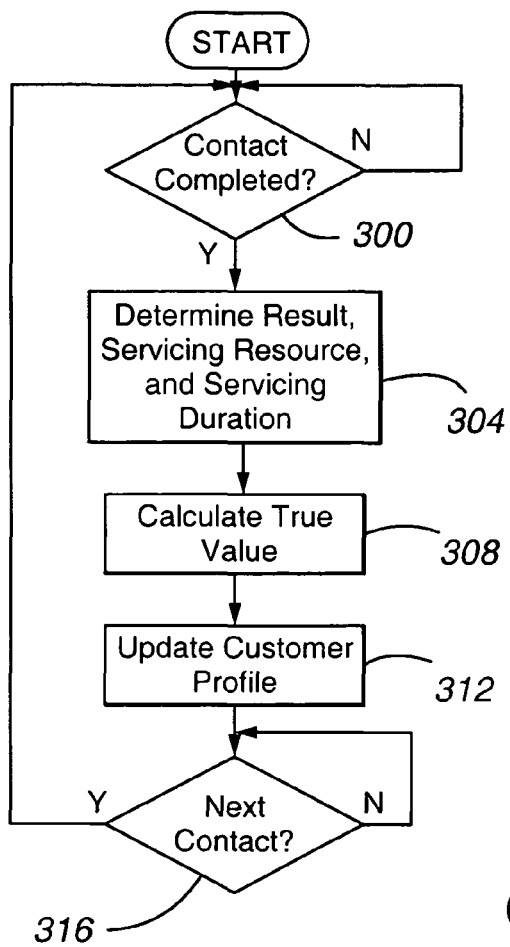
FIG. 3 is a flow chart depicting an operational embodiment of the customer valuation agent.

The operation of the valuation agent 220 is depicted in FIG. 3. In decision diamond 300, the agent 220 determines if a contact for a selected customer or any customer is completed. Decision diamond 300 is repeated until the selected customer or any customer contact is completed. When a contact is completed, the agent 220 in step 304 determines the result of the contact, the identity of the servicing resource(s) (e.g., agent identities), and the duration of the contact as a whole and/or of the portion of the contact serviced by each servicing resource. As will be appreciated, the "result" can refer to whether or not a sale was made and, if so, the identities of the products sold (e.g., product serial numbers, product identity codes, etc.), the values of the products sold, and/or the cumulative sales resulting from the contact or to whether or not product service was provided and, if so, the identities of the products serviced. In step 308, the agent 220 calculates the cumulative contact expense associated with each resource servicing part of the contact, multiplies the contact expense by the respective service duration of each resource, determines the cost of goods sold for the products sold to the customer, and the gross sales revenue from the transaction. From these variables, the true value of the current contact can be determined. In step 312, the true value of the customer is updated to reflect the true value of the current contact. Typically, this is done by adding the true value of the current contact to the current stored true value of the customer. The customer's profile is updated to reflect the revised true customer value. In decision diamond 316, the agent 220 determines if there is a next contact to monitor. Decision is revisited by the agent 220 until a next contact is identified. If a next contact is identified, the agent 220 returns to decision diamond 300.

Figure 4:
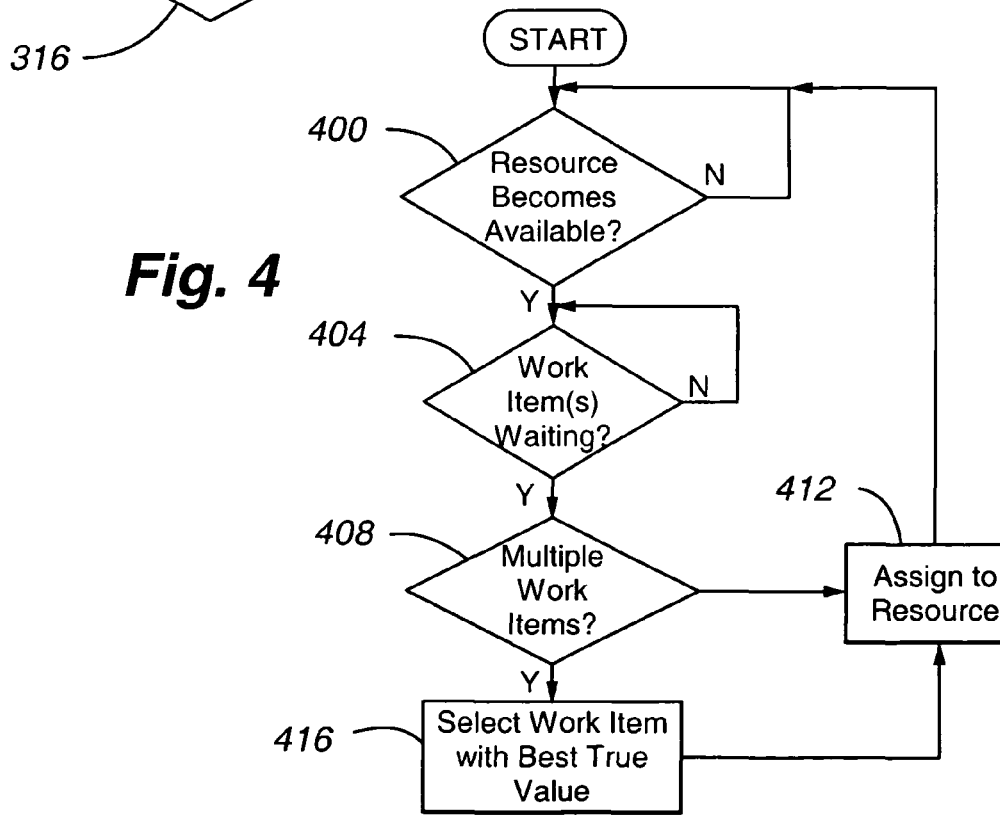
FIG. 4 is a flow chart depicting an operational embodiment of the contact selector.
Figure 5:
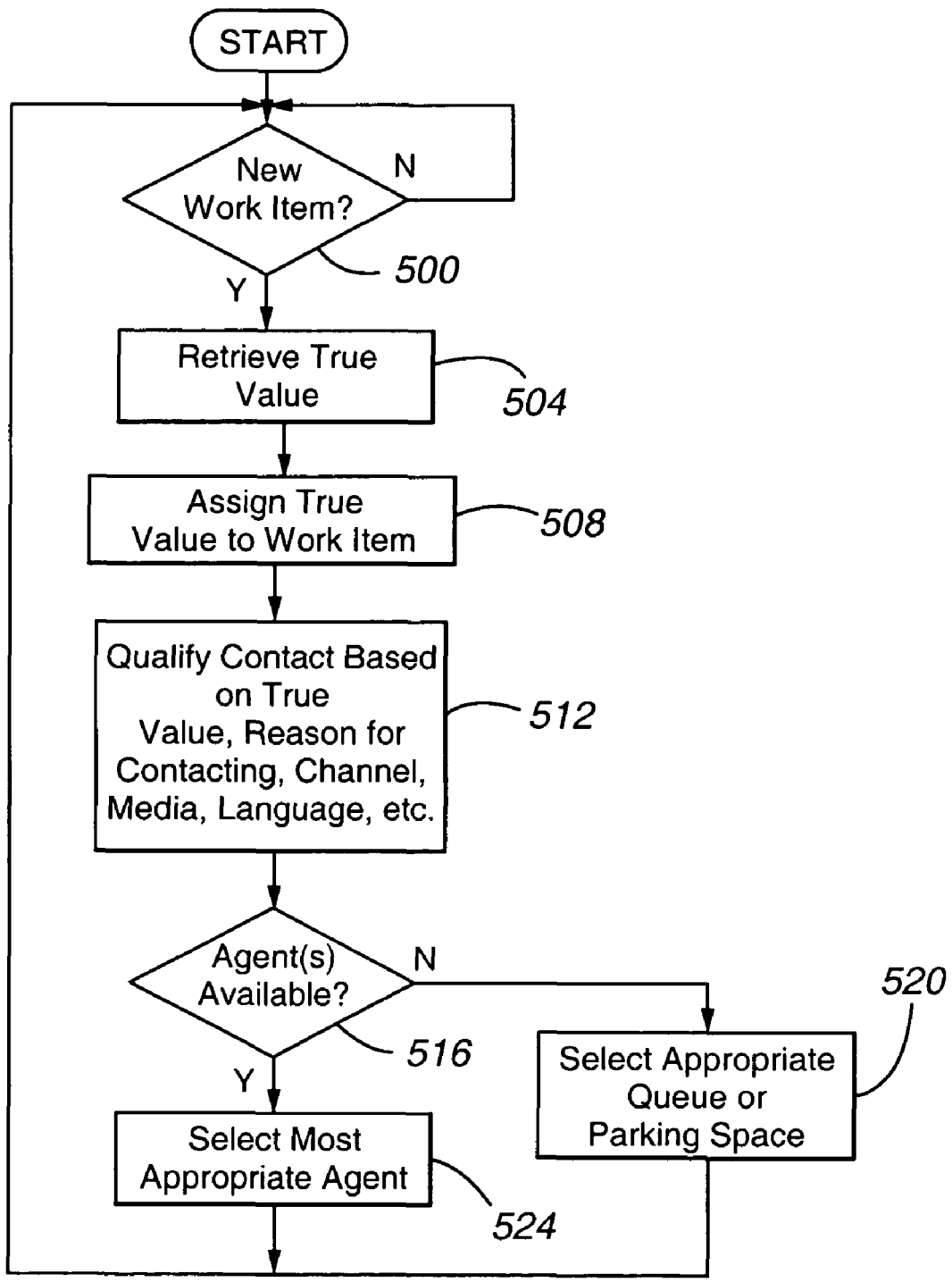
FIG. 5 is a flow chart depicting an operational embodiment of the contact selector.

The operation of the contact selector 216 is shown in FIGS. 4 and 5.

Referring to FIG. 4, the selector 216 in decision diamond 400 determines if a resource, such as a human agent, becomes available (hereinafter referred to as "agent"). Decision diamond 400 is repeated until such an agent is available. When an agent is available, the selector 216 proceeds to decision diamond 404, where the selector 216 determines if there are any work items, such as contacts, waiting to be serviced in the queue corresponding to the skill of the available agent. Decision diamond 404 is repeated until one or more work items is available to be serviced by the available agent. When one or more work items is available, the selector 216, in decision diamond 408, determines if there are multiple work items waiting to be serviced. If not, the available work item is assigned to the available resource in step 412. If so, the work item with the highest or best true value is selected to be serviced and the available resource is assigned to service the contact in step 416 provided other contact center criteria or policies are not violated by the assignment. The various work items can be tagged or linked to a corresponding true value when the work item is initially qualified and before it is enqueued. For example, if a customer/contact having a lower true value has been waiting in queue or is expected to wait in queue more than a selected time period, the lower true value customer/contact may be selected.

Referring to FIG. 5, a second operational embodiment of the selector 216 is depicted. The selector 216 in decision diamond 500 determines if a work item is available to be serviced. Decision diamond 500 is repeated until such a work item is available. When a work item is available, the selector 216, in step 504, receives from the valuation agent 220 the true value of the customer/contact. The true value of the customer/contact is assigned or linked to the work item in step 508. In step 512, the contact is qualified based on the true customer value, true contact value, reason for contacting, channel, media, language, time-of-day, day-of-week, and other predetermined criteria to determine the appropriate agent skill for the work item. In decision diamond 516, the selector 216 determines if one or more agents is available to service the work item. When an agent is not available, the selector 216, in step, selects the appropriate queue and queue position (or other parking location) for the work item. When an agent is available, the selector 216, in step 520, selects the most appropriate agent to service the work item. After performing either step 520 or 524, the selector 216 returns to decision diamond 500.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
    (a) receiving, in real time, by a computer, a first contact from a first customer, wherein at least one of the first customer and first contact has an associated first value to a contact center, wherein the associated first value reflects an income received by the contact center from the first customer or from a set of other similar customers for a contact type when no first customer history is known;
    (b) deriving the associated first value by calculating the following equation: first value=expected revenues−expected costs−average expense directly attributed to a customer responsible for a contact;
    wherein the expected revenues are based on a weighted average historical revenue for a contact type for a set of similar customers when the first customer is unknown, and a weighted average historical revenue for all contact types for the first customer when the first customer is known;
    wherein the expected costs are based on a weighted average historical cost for the contact type for the set of similar customers when the first customer is unknown, a weighted average historical cost for all contact types for the first customer when the first customer is known, predicted cost to service a future contact with the first customer, and current costs to service a current contact waiting to be serviced by a resource;
    wherein the average expense directly attributed to the customer responsible for the contact is based on customer specific expenses, which are not otherwise considered in the expected costs, and which are attributed to the customer but not caused by the customer;
    (c) selecting in real time, by the computer,
        (i) an available resource of the contact center to service the first contact and
        (ii) a service priority for the first contact, relative to contacts from other customers, based, at least in part, on the associated first value;
    (d) placing the first contact into a queue of contacts based, at least in part, on the selected service priority of the first contact relative to service priorities for the contacts from other customers in the queue, wherein the queue of contacts is ordered based on the selected service priorities; and
    (e) assigning, in real time, a contact, based on the order of the queue, to the selected available resource.

2. The method of claim 1, wherein the predicted cost comprises a plurality of pro-rated compensation of one or more agents in servicing the at least one of the first and a second contact, pro rated benefits of one or more agents in servicing the at least one of the first and second contact, and a media dependent cost for a media type used by the at least one of the first and second contact.

3. The method of claim 1, wherein the average expense comprises an agent salary and benefits of an agent servicing past contacts with the first customer, costs to train agents servicing the past contacts with the first customer, and contact media costs.

4. The method of claim 2, wherein the predicted cost depends on a type of media used by the first contact and wherein different first and second communication media types are associated with different predicted costs.

5. The method of claim 1, further comprising: comparing a first customer profile associated with the first customer with a second customer profile associated with a second customer to determine, based at least in part on the historic sales of the second customer, future sales projections of the first customer.

6. The method of claim 1, wherein the first value is determined, at least in part, by dividing average expenses directly attributable to the first customer over a specified time period less revenue generated from contacts over the time period.

7. A machine, comprising: a processor operable to:
receive, in real time, by a computer, a first contact from a first customer, wherein at least one of the first customer and first contact has an associated first value to a contact center, wherein the associated first value reflects an income received by the contact center from the first customer or from a set of other similar customers for a contact type when no first customer history is known; and
derive the associated first value by calculating the following equation: first value=expected revenues−expected costs−average expense directly attributed to a customer responsible for a contact;
  wherein the expected revenues are based on a weighted average historical revenue for a contact type for a set of similar customers when the first customer is unknown, and a weighted average historical revenue for all contact types for the first customer when the first customer is known;
  wherein the expected costs are based on a weighted average historical cost for the contact type for the set of similar customers when the first customer is unknown, a weighted average historical cost for all contact types for the first customer when the first customer is known, predicted cost to service a future contact with the first customer, and current costs to service a current contact waiting to be serviced by a resource:
  wherein the average expense directly attributed to the customer responsible for the contact is based on customer specific expenses, which are not otherwise considered in the expected costs, and which are attributed to the customer but not caused by the customer;
select in real time, by the computer, at least one of
  an available resource of the contact center to service the first contact and
  a service priority for the first contact, relative to contacts from other customers, based, at least in part, on the associated first value;
place the first contact into a queue of contacts based, at least in part, on the selected service priority of the first contact relative to service priorities for the contacts from other customers in the queue, wherein the queue of contacts is ordered based on the selected service priorities; and
assign, in real time, a contact, based on the order of the queue, to the selected available resource.

8. The machine of claim 7, wherein the predicted cost comprises a plurality of pro-rated compensation of one or more agents in servicing the at least one of the first and a second contact, pro rated benefits of one or more agents in servicing the at least one of the first and second contact, and a media dependent cost for a media type used by the at least one of the first and second contact, and wherein the first value reflects an income received by the contact center from the first customer and a set of other similar customers.

9. The machine of claim 7, wherein the average expense is reduced by expenses attributable to the first customer for which the first customer is not responsible and wherein the average expense comprises one or more of agent salary and benefits of an agent servicing past contacts with the first customer, costs to train agents servicing the contacts with the first customer, and contact media costs.

10. The machine of claim 7, wherein the first value reflects a first contact expense and wherein different first and second communication media types are associated with different predicted costs.

11. The machine of claim 7, wherein a first predicted cost for a contact using a first communication medium is different from a second predicted cost for a contact using a second communication medium.

12. The machine of claim 7, wherein the expected cost is determined by a historical cost comprising a cost of goods sold for a selected set of products.

13. A computer program product comprising computer executable instructions encoded on a non-transitory computer readable medium, which, when executed by a computer, cause the computer to:
receive, in real time, by the computer, a first contact from a first customer, wherein at least one of the first customer and first contact has an associated first value to a contact center, wherein the associated first value reflects an income received by the contact center from the first customer or from a set of other similar customers for a contact type when no first customer history is known; and
derive the associated first value by calculating the following equation: first value=expected revenues−expected costs−average expense directly attributed to a customer responsible for a contact;
  wherein the expected revenues are based on a weighted average historical revenue for a contact type for a set of similar customers when the first customer is unknown, and a weighted average historical revenue for all contact types for the first customer when the first customer is known;
  wherein the expected costs are based on a weighted average historical cost for the contact type for the set of similar customers when the first customer is unknown, a weighted average historical cost for all contact types for the first customer when the first customer is known, predicted cost to service a future contact with the first customer, and current costs to service a current contact waiting to be serviced by a resource;
  wherein the average expense directly attributed to the customer responsible for the contact is based on customer specific expenses, which are not otherwise considered in the expected costs, and which are attributed to the customer but not caused by the customer;
select in real time, by the computer, at least one of
  an available resource of the contact center to service the first contact and
  a service priority for the first contact, relative to contacts from other customers, based, at least in part, on the associated first value,
place the first contact into a queue of contacts based, at least in part, on the selected service priority of the first contact relative to service priorities for the contacts from other customers in the queue, wherein the queue of contacts is ordered based on the selected service priorities; and
assign, in real time, a contact, based on the order of the queue, to the selected available resource.

14. The product of claim 13, wherein the average expense is reduced by expenses attributable to the first customer for which the first customer is not responsible and wherein the average expense comprises agent salary and benefits of an agent servicing past contacts with the first customer, costs to train agents servicing the contacts with the first customer, and contact media costs.

15. The product of claim 13, wherein the predicted cost depends on a type of media used by the first contact, wherein the predicted cost is based on a monetary contact center expense, and wherein different first and second communication media types are associated with different predicted costs.

16. The product of claim 13, further comprising:
comparing a first customer profile associated with the first customer with a second customer profile associated with a second customer to determine, based at least in part on historic sales of the second customer, future sales projections of the first customer.

* * * * *